J. R. MOFFITT.
Thrashing Machine.
No. 718. Reissued May 17, 1859.
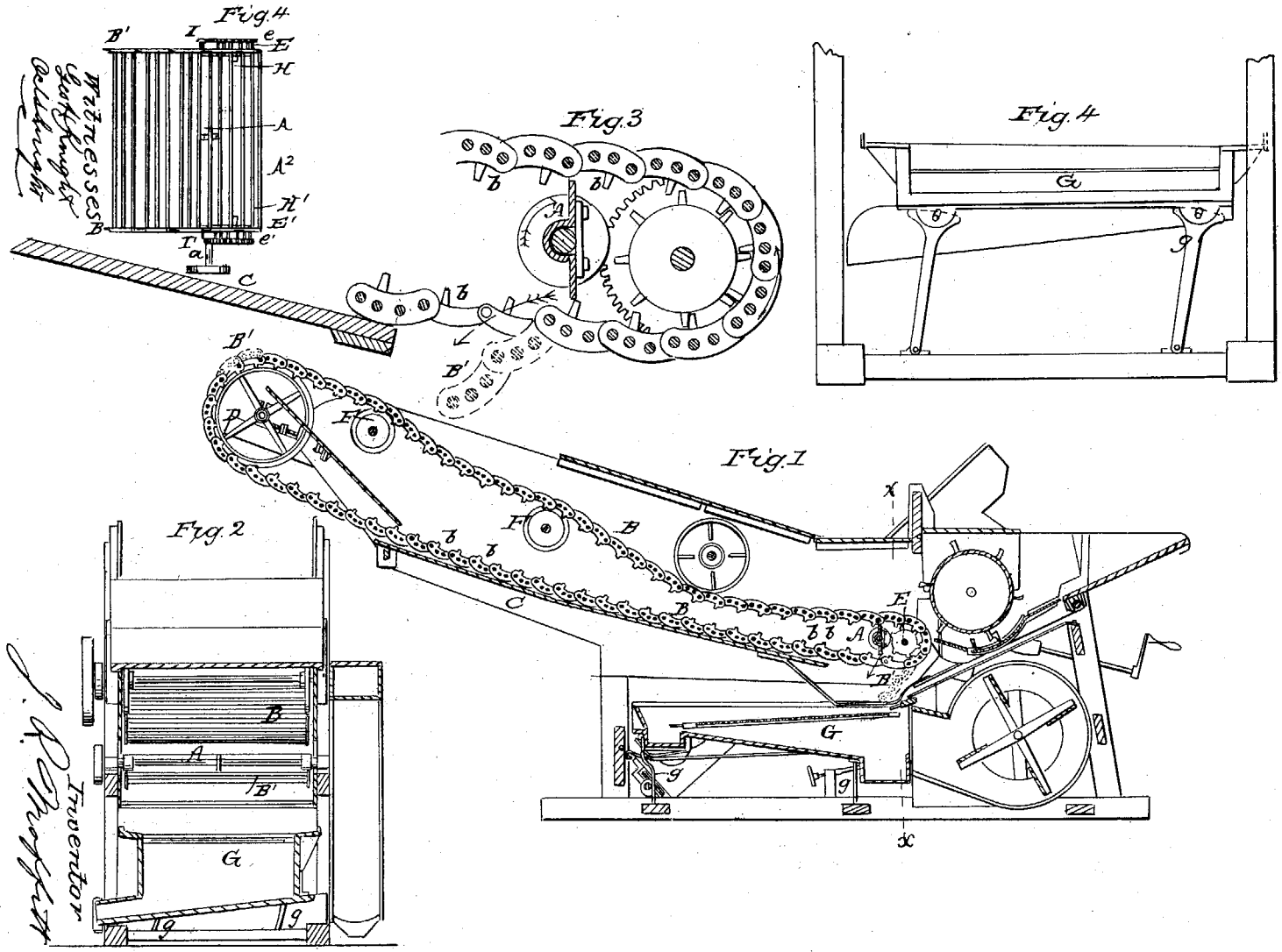
N. PETERS. Photo-Lithographer, Washington, D. C.

UNITED STATES PATENT OFFICE.

JOHN R. MOFFITT, OF PIQUA, OHIO.

IMPROVEMENT IN GRAIN-SEPARATORS.

Specification forming part of Letters Patent No. 18,761, dated December 1, 1857; Reissue No 718, dated May 17, 1859.

*To all whom it may concern:*

Be it known that I, JOHN R. MOFFITT, of Piqua, Miami county, Ohio, have invented a new and useful Improvement in Grain-Separators; and I hereby declare the following to be a full and exact description of the same, reference being had to the annexed drawings, making part of this specification.

The subject of my invention is an arrangement for removing straws and other extraneous matters from the interior of an open straw-carrying apron.

In the accompanying drawings, Figure 1 is a longitudinal section of the machine. Fig. 2 is a transverse section at the line *x x*, Fig. 1. Fig. 3 is a longitudinal section of the lower end of the straw-carrying and grain-separating apron. Fig. 4 is a top view of the same.

A is the frame of the machine and may be mostly of wood.

B is an open continuous apron, carried by a pulley, D, at the upper end, and by a pair of driving pinion-gears, E *e* E′ *e*′, at the lower end, hereinafter more particularly described. This apron may be constructed substantially as described in my patent of November 30, 1852—that is to say, composed of two chains, united by slats at suitable intervals, permitting the descent of the grain and conveying off and discharging the straw at the rear of the machine. Each link is provided with a tooth, *b*. These teeth, meshing with the chain-gears E and E′, enable the propulsion of the apron by said chain-gears. This mode of propulsion causes the apron to be quite slack at its upper or advancing side, which is thus adapted for violent agitation at each impact of the teeth *b* with the rollers F. Stud-shafts H H′, projecting inwardly from the sides of the frame, support compound pinions or chain-gears E *e* E′ *e*′, whose pinions *e e*′ mesh with and are driven by spur-wheels I I′ on the beater-shaft *a*. The other members, E E′, constitute chain-gears, which mesh with the carrier-chains B′ B″. This plan of construction completely and successfully supersedes the necessity of any shaft extending across the interior of the carrier from pinion to pinion, which shaft, when so extending, is extremely liable to become clogged by the winding around it of straw and other trash. Instead, however, of being from the beater-shaft driven the two chain-gears may be driven by two bevel gear-shafts gearing directly to the main shaft; but whatever mechanism is employed must be positive, and must proceed from a single motor, that there may be an exact uniformity of action between the two chain-gears.

B‴ (represented by red lines) are sections of the carrying-apron, consisting of one, two, or more links, which, being attached by but one edge, simply rest upon the main portion of the chain, so as to form a continuous slat surface on the advancing or upper side of the apron, but on the return motion fall by their gravity until they reach the chute-board C, by which they are supported until they approach the driving-chain gear E *e* E′ *e*′, where, escaping from the chute-board, they suddenly drop, and thus liberate the straw and trash that have accumulated within the apron, the liberation taking place where the straw and other matters most accumulate. But most of the trash which thus collects is so very light that it is unable by its mere gravity to drop through the ventage thus provided during the necessarily brief periods of the passage of the loose sections under the place of accumulation. I have therefore provided within the space between the upper and the lower portions of the apron, and extending parallel to and of nearly equal length with the slats, a rotating beater, A, which, moving with considerable velocity, effectually ejects the extraneous matters, which, when permitted to accumulate, very soon clog the driving mechanism of the apron. The grain and other matters which fall through the apron onto the chute-board C are conveyed thereby to the shoe G, entering that part of the machine in company with the matters which escape through the falling sections of the apron.

The operation of the falling sections and beater is as follows: At the upper or advancing part of their motion the sections B‴ remain closed by their own weight, forming a continuous conveyer for the straw; but after passing over the pulley D they are supported by the chute-board C until, in their return motion, approaching the lower end of the apron, where the greatest accumulation of matter takes place, they escape from the chute-board, and at this point the beater A, rotating in the direction indicated by the arrow, operates in connection with the falling section and effectually removes any such accumulation.

I am aware that straw-carriers have been constructed with falling sections, but have been to a great extent inoperative from difficulties already recited.

I claim as new and as of my invention herein—

The construction and arrangement, substantially as described, of the rotary beater A within the apron, in combination with the falling sections B‴, operating in the manner and for the purposes set forth.

In testimony of which invention I hereunto set my hand.

J. R. MOFFITT.

Witnesses:
GEO. H. KNIGHT,
OTIS KNIGHT.